May 21, 1968  O. HANSEN, JR  3,384,524
TRANSFER AND LABELING MACHINE
Filed April 30, 1964  7 Sheets-Sheet 1
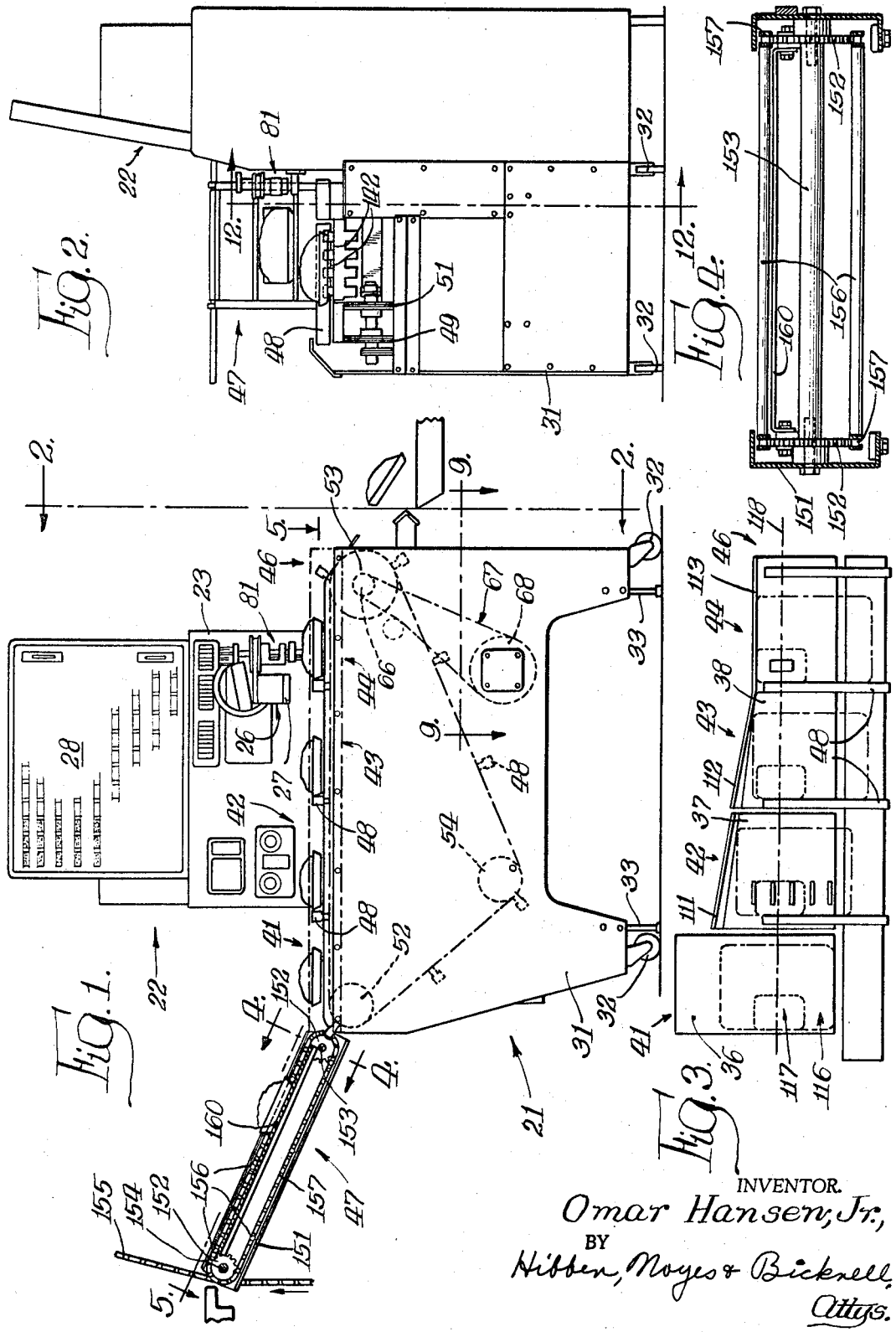
INVENTOR.
Omar Hansen, Jr.,
BY
Hibben, Noyes & Bicknell
Attys.

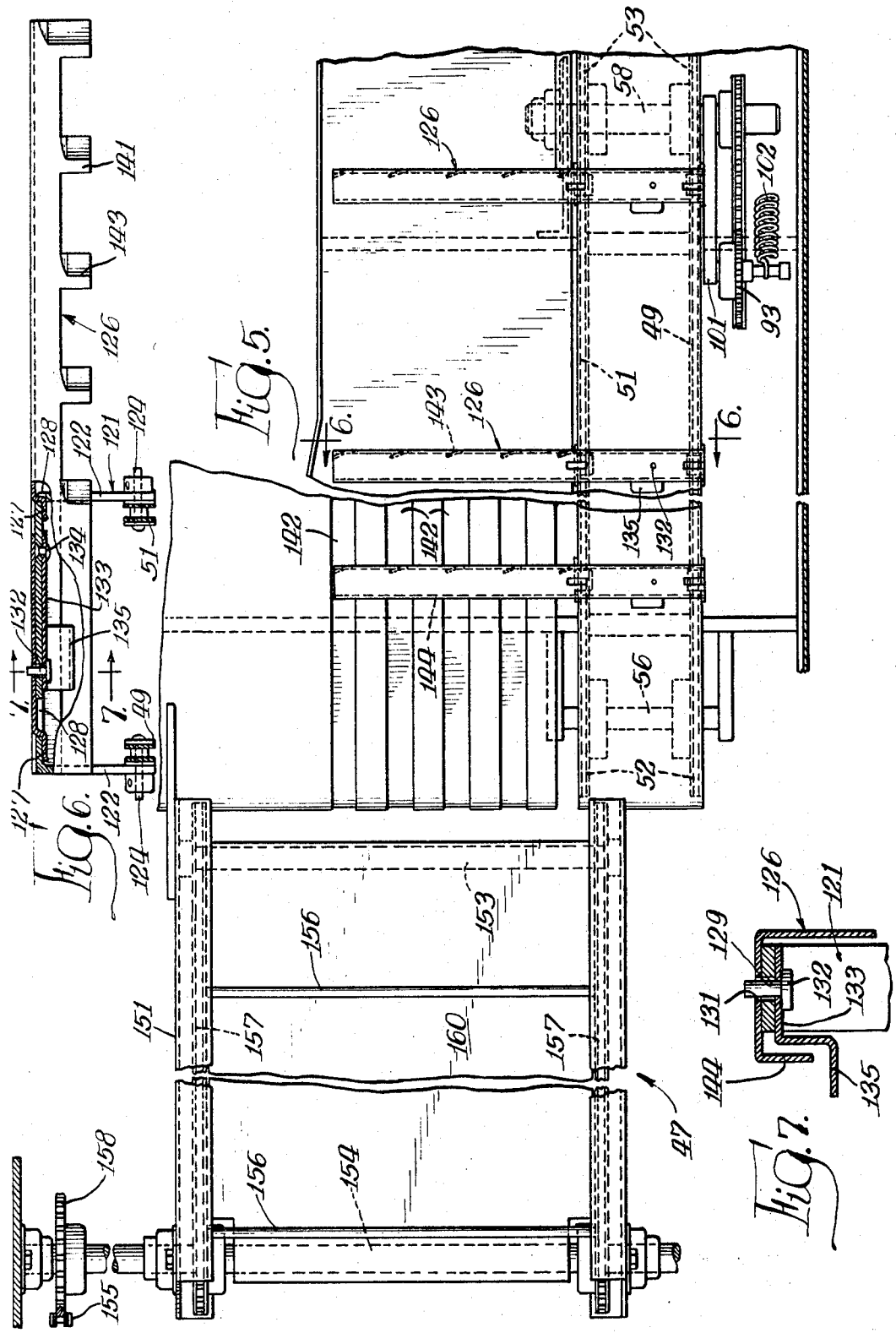

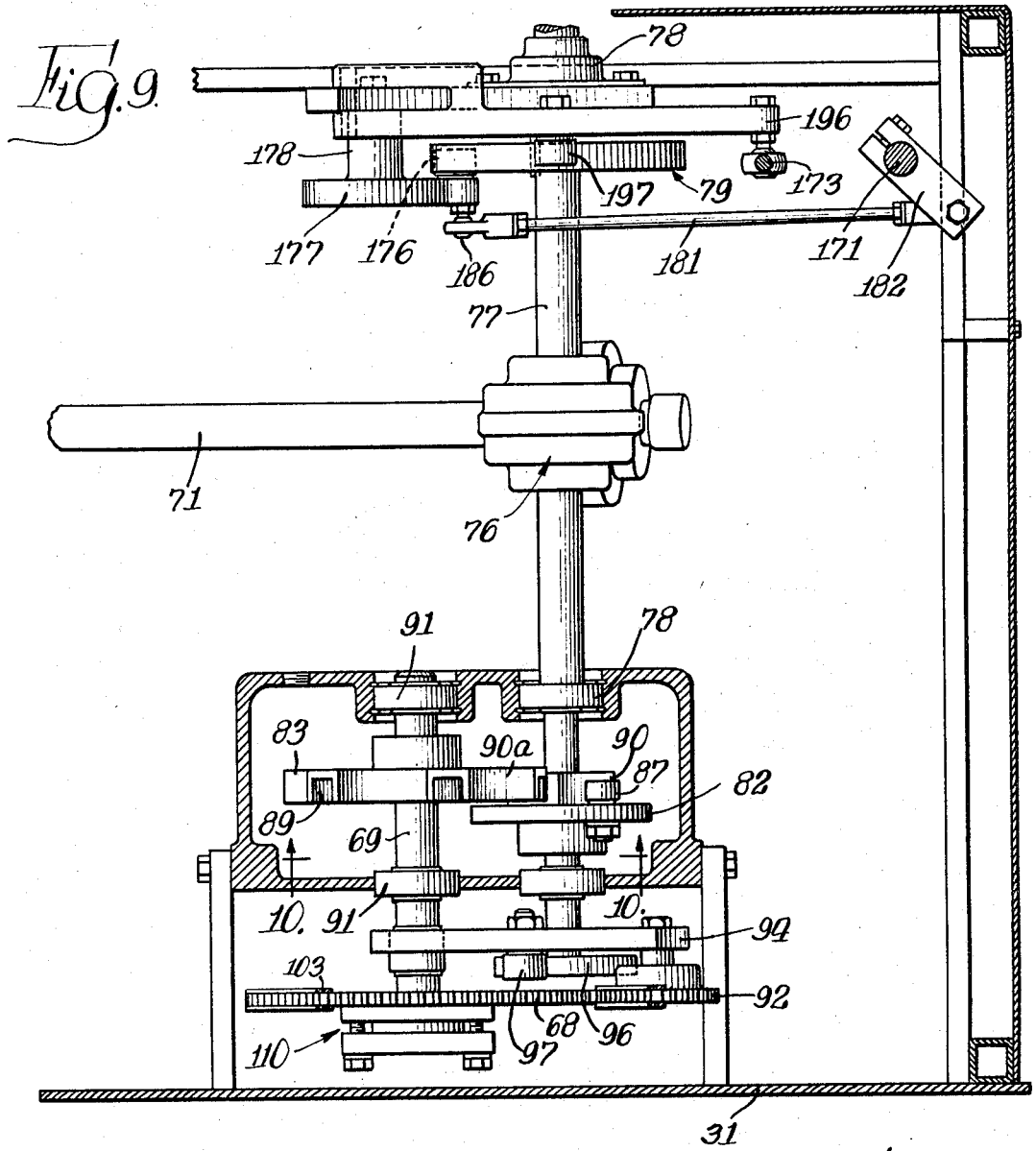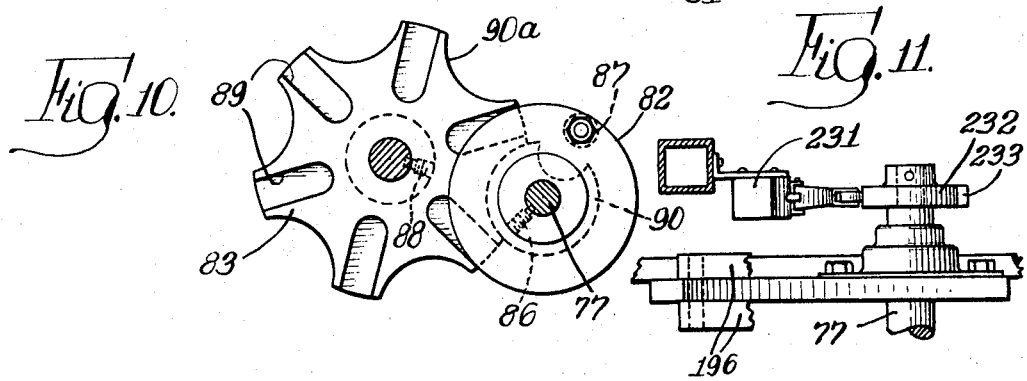

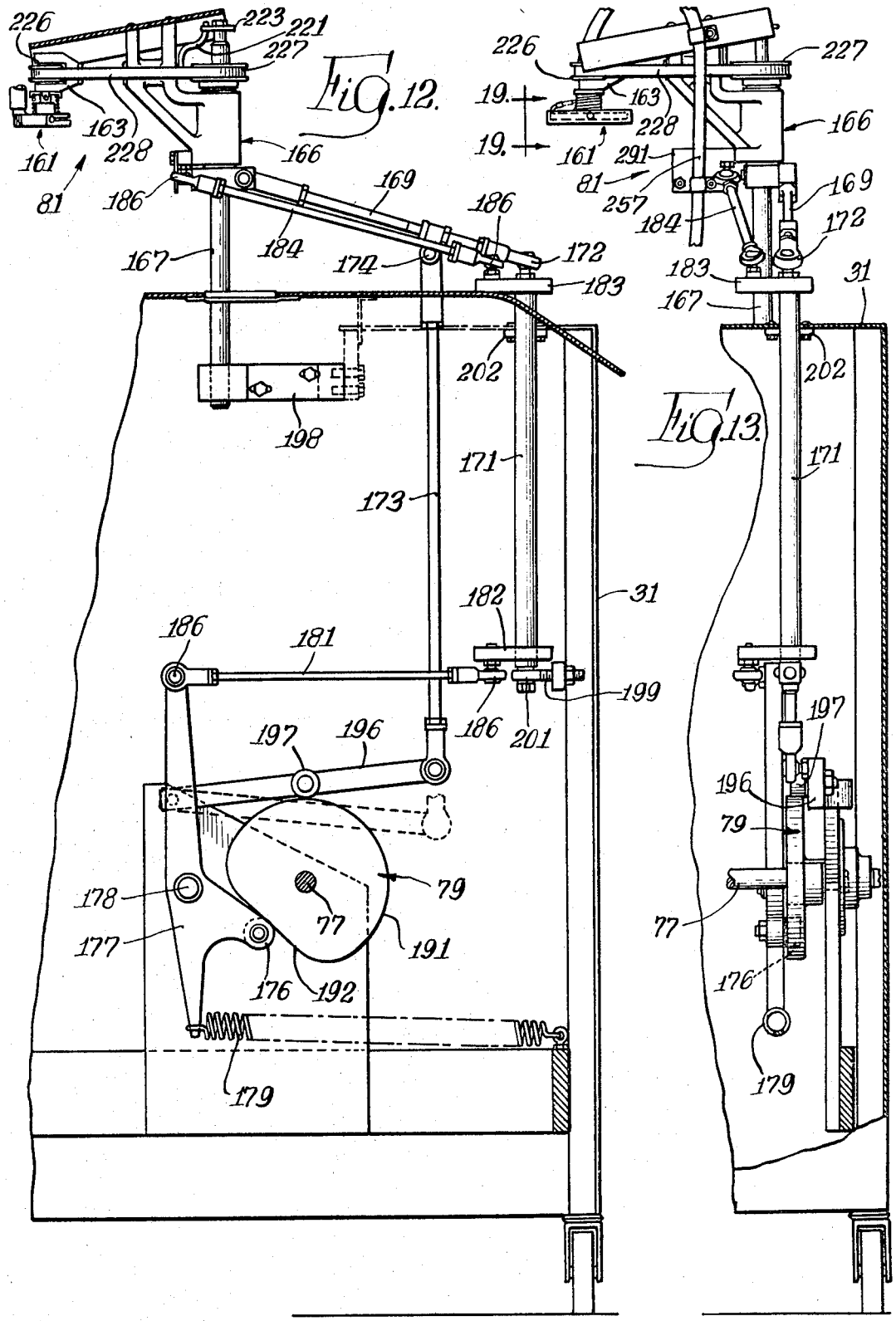

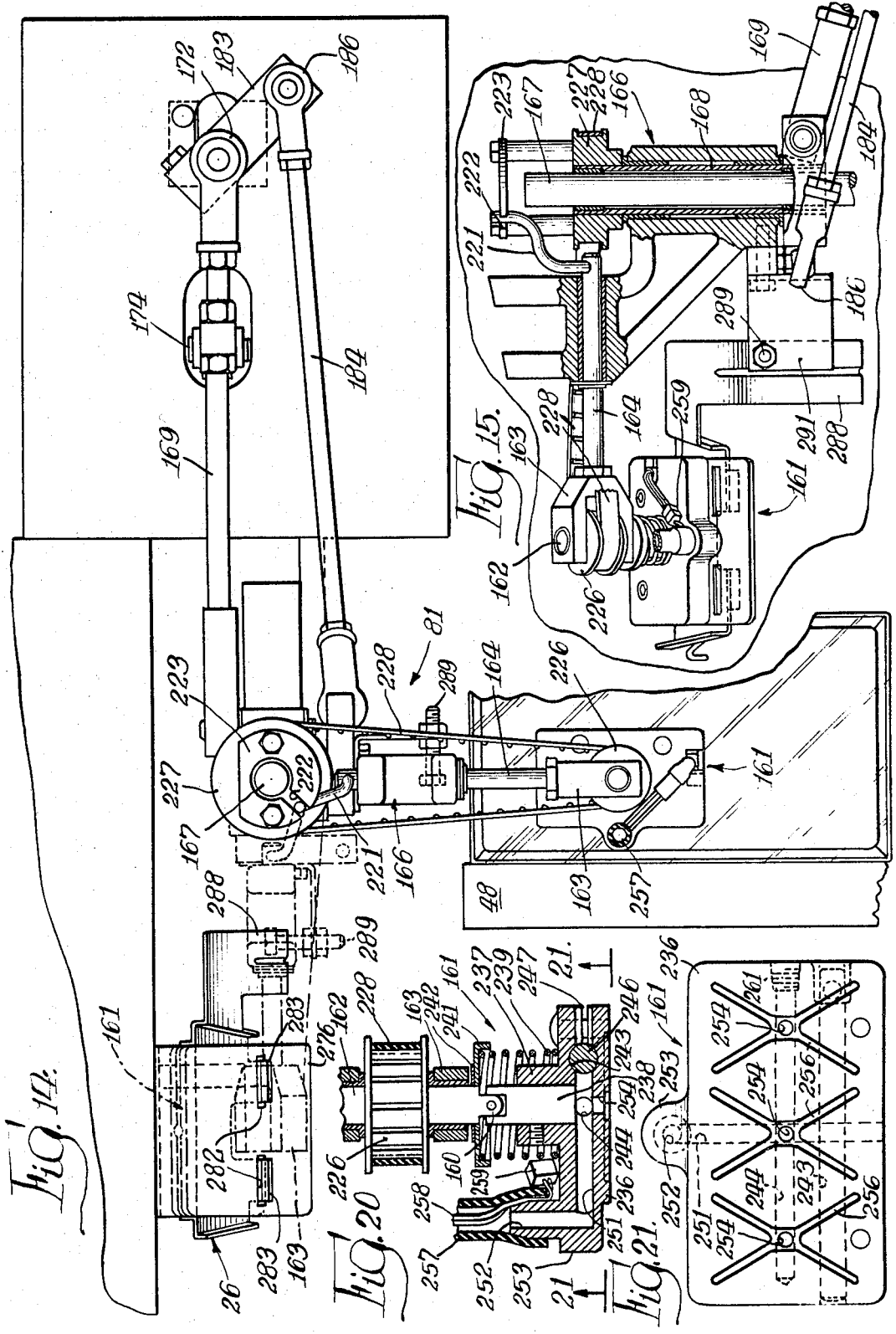

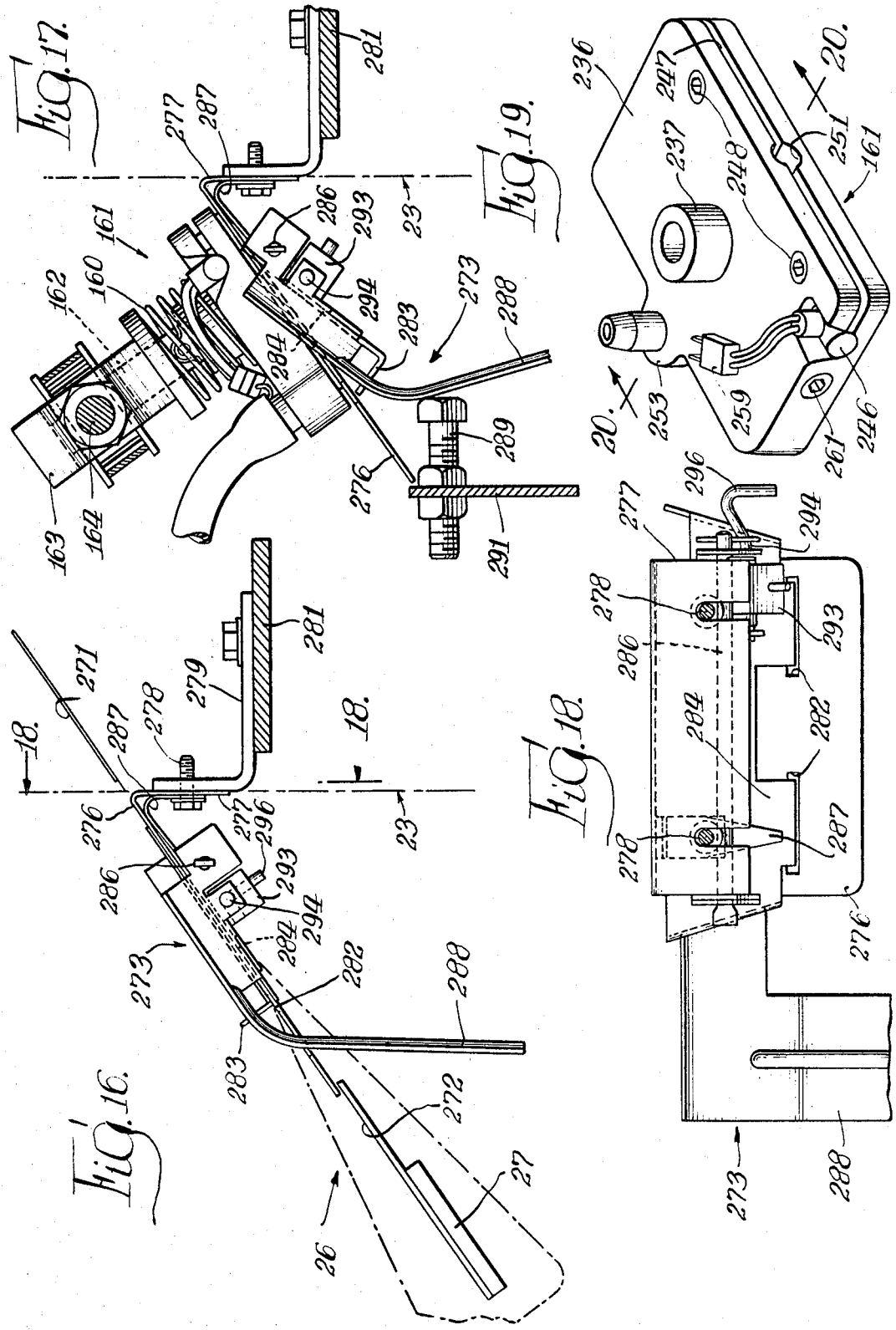

United States Patent Office 3,384,524
Patented May 21, 1968

3,384,524
TRANSFER AND LABELING MACHINE
Omar Hansen, Jr., Bluffton, Ind., assignor to Franklin Electric Company, Inc., Bluffton, Ind., a corporation of Indiana
Filed Apr. 30, 1964, Ser. No. 363,955
26 Claims. (Cl. 156—360)

ABSTRACT OF THE DISCLOSURE

This disclosure relates to a machine which is designed for use with a computer type scale of the type which weighs an article, computes certain data based on the weight of the article, prints the data on a label, and delivers the label to a label chute. The present machine receives a series of articles, such as wrapped packages of fresh meat, and automatically moves the articles in succession on to the scale where they are weighed, off of the scale and to a location adjacent the label chute where a mechanism of the machine picks up a label and fastens the label to the article, and then out of the machine.

---

It is an object of this invention to provide a machine for use with a computer type scale which is operable to weigh a package, and if desired compute certain information about the package, print the information and/or weight on a label, and deliver the label to an accessible point.

It is another object of this invention to provide a machine of the foregoing character, which will automatically place the package on the weighing platform of the scale, move the package off the platform after it has been weighed, pick up the printed label and place the label on the package.

Still another object is to provide a machine of the foregoing character, including novel transfer means for moving the package from one position to another at a rate which may be related to the speed of operation of the scale.

A still further object is to provide a machine of the foregoing character, wherein the major portion of the movement of the transfer means is in one direction only, as distinguished from reciprocating movement.

Still a further object is to provide a machine of the foregoing character, including novel means for picking up a label and placing the label on a package.

Still another object is to provide a machine of the foregoing character, including a novel attachment for operating the scale either by hand or automatically.

Another object is to provide a machine for use with a computer type scale, including novel means for automatically placing the package on the weighing platform of the scale, moving the package after it has been weighed, and then moving the package past a labeling station to a discharge station.

And still another object is to provide a machine for use with a computer type scale, including novel means for automatically picking up a printed label issued by the scale and placing a printed label on a package.

Other objects and advantages of the invention will become apparent from the following description taken in conjunction with the accompanying figures of the drawings, in which:

FIG. 1 is a side elevational view of apparatus embodying the invention;

FIG. 2 is an end elevational view taken on the line 2—2 of FIG. 1;

FIG. 3 is a top elevational view of a portion of the apparatus;

FIG. 4 is an enlarged sectional view taken on the line 4—4 of FIG. 1;

FIG. 5 is an enlarged fragmentary view taken on the line 5—5 of FIG. 1;

FIG. 6 is an enlarged fragmentary sectional view taken on the line 6—6 of FIG. 5;

FIG. 7 is a further enlarged fragmentary sectional view taken on the line 7—7 of FIG. 6;

FIG. 9 is an enlarged fragmentary sectional view taken on the line 9—9 of FIG. 1;

FIG. 10 is a fragmentary sectional view taken on the line 10—10 of FIG. 9;

FIG. 11 is a fragmentary top elevational view of a portion of the apparatus shown in FIG. 9;

FIG. 12 is a fragmentary enlarged sectional view taken on the line 12—12 of FIG. 2;

FIG. 13 is a fragmentary end elevational view of the apparatus shown in FIG. 12;

FIG. 14 is a fragmentary top elevational view of the apparatus shown in FIGS. 12 and 13;

FIG. 15 is a view partially in section of a portion of the apparatus shown in FIGS. 12 to 14;

FIG. 16 is a fragmentary enlarged side elevational view of a portion of the apparatus shown in FIG. 1;

FIG. 17 is a view similar to FIG. 16 but showing an alternative position of the apparatus;

FIG. 18 is a fragmentary sectional view taken on the line 18—18 of FIG. 16;

FIG. 19 is a fragmentary enlarged perspective view taken on the line 19—19 of FIG. 13;

FIG. 20 is a sectional view taken on the line 20—20 of FIG. 19; and

FIG. 21 is a bottom view of the apparatus shown in FIGS. 19 and 20 and taken on the line 21—21 of FIG. 20.

Figure 8:
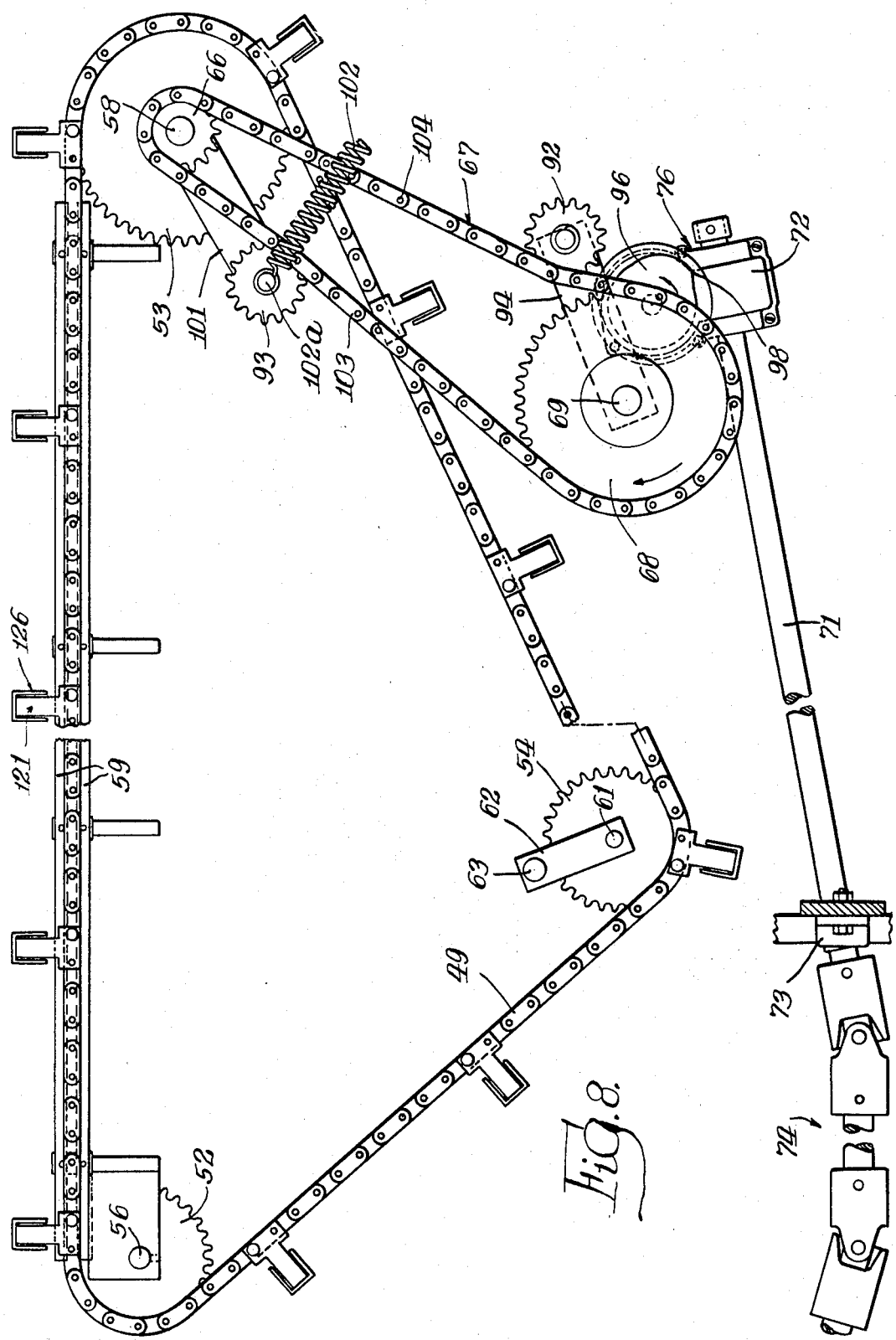
FIG. 8 is a side elevational view of a drive mechanism of the apparatus.

Generally a machine embodying the invention is designed for use with a computer type scale, and, when so used, will provide automatic weighing and labeling of a series of packages. The scale includes a weighing platform, means for weighing a package positioned on the platform, means for printing information determined by the weighing means on a label, and a label chute which receives the printed label, the chute being spaced from the platform.

The machine comprises means forming a package transport path leading from an input station to a weighing station at the weighing platform of the scale, from the weighing station to a labeling station adjacent the chute, and from the labeling station to an output station. A delay station is preferably also provided between the weighing and labeling stations to give the scale time to compute the information and print a label when the speed of the system is at the capacity of the scale. The machine further comprises means for mounting and moving at least one transfer arm along the path, such means causing the arm to transfer an article from one station to the next and, at each station, to momentarily stop and back away from the package to permit undisturbed weighing and labeling of the package. The rate of operation of the machine may be adjusted such that the length of time required for the package to be moved from the weighing station to the labeling station substantially equals the length of time required for the scale to compute the information, print the information on a label, and place the printed label in the chute.

The machine further includes means for picking up a label in the chute and placing the label at a certain location on the package and a device which may be attached to the chute to permit either manual or automatic operation of the scale. The mounting and moving means for the transfer arm is preferably such that the transfer arm may be easily removed when manual operation of the scale is desired.

In greater detail, a transfer and labeling machine embodying the invention is indicated by the numeral 21 in FIGS. 1 and 2, and is positioned for use with a computer type scale indicated by the numeral 22. The scale 22 may be a standard mechanism of the type manufactured by Toledo or Hobart, and includes a frame 23 on which is mounted on a weighing platform means within the frame 23 for computing the weight of and, if desired, price information concerning a package placed on the platform, means for printing the computed information on a label, and means for placing the label in a label chute 26 adjacent the machine 21. At the lower end of label chute, the scale is ordinarily provided with a heater element 27 for heating a label placed thereon in order to activate the glue on the label. The scale 22 may also include a suitable card rack 28 for receiving price information regarding a variety of types of material which might be weighed by the scale, the cards having information stored on them, which regulates the computations effected by the scale.

The machine 21 comprises a generally rectangular frame 31 mounted on wheels 32 for movement about the floor, and adjustable screws 33 adjacent the wheels 32 for levelling the machine when in operative position adjacent the scale 22. Extending longitudinally of the machine 21 along the top thereof is means forming a package transport path, the path being formed by a series of plates 36, 37 and 38 (FIG. 3). The plate 36 is at the beginning of the path and initially receives packages that are fed into the machine. The plate 37 constitutes the scale platform and is movable so that a package placed on the plate 37 will be weighed by the scale, the scale of course being adjusted to compensate for the weight of the plate 37. Forwardly of the plate 37, in the direction of movement of the packages, is the plate 38 which extends from the plate 37 to the forward end of the machine. Positions along the transport path may be designated an input station indicated by the numeral 41 (FIGS. 1 and 3), a weighing station indicated by the numeral 42, a delay station indicated by the numeral 43, a labeling station indicated by the numeral 44, and an output or discharge station indicated by the numeral 46. Articles may be fed into the machine at the input station 41 by means of an infeed conveyor 47 (FIG. 1) to be described in more detail hereinafter, which in turn may receive the packages from a wrapping machine (not shown) of the character described in the Littlefield application Ser. No. 219,482, filed Aug. 27, 1962 now Patent No. 3,248,848 or the Hansen et al. application Ser. No. 363,954, filed Apr. 30, 1964.

The machine 21 further includes a plurality of spaced apart transfer arms 48 for moving the packages along the transport path from one station to the next. The transfer arms 48 are attached to a pair of laterally spaced chains 49 and 51, each of which is mounted for movement in a vertical plane on three sprockets 52, 53 and 54 (FIGS. 1, 2 and 8). The two sprockets 52 are mounted on a shaft 56 mounted on the frame at the upper and rearward corner of the machine, the two sprockets 53 being located at the upper and forward corner of the machine and secured to a shaft 58, the shaft 58 being mounted for rotation on the frame, and the two sprockets 54 being mounted on a shaft 61 at a location spaced downwardly from and between the sprockets 52 and 53, the shaft 61 being mounted on an arm 62. The arm 62 (FIG. 8) is pivotally mounted on the frame of the machine by means of a member 63, and the position of the sprockets 54 on the two chains 49 and 51 is such that the chains 49 and 51 are held taut. Thereafter the member 63 is adjusted to lock the arm 62 and the sprockets 54 in place. Vertically spaced pairs of guides 59 (FIG. 8) for the chains 49 and 51 extend longitudinally along the transport path.

The drive for the chains 49 and 51 and the transfer arms 48 comprises a sprocket 66 secured to the shaft 58 for the sprockets 53. The sprocket 66 is connected by another chain 67 to a drive sprocket 68 (FIGS. 1, 8 and 9) which in turn is secured to a shaft 69.

With reference to FIGS. 8 and 9, power for operating the machine is provided by means of a longitudinally extending drive shaft 71 which is rotatably mounted on the frame of the machine by means of bearings 72 and 73. At its rearward end, the drive shaft 71 may be connected to a drive unit as by a universal coupling assembly 74. When the transfer and labeling machine is used in conjunction with a wrapping machine, the drive unit (not shown) is preferably the same unit which drives the wrapping mechanism of the wrapping machine so that the operation of the transfer and labeling machine will always be synchronized with the operation of the wrapping machine. The power input connection to the universal coupling assembly 74 may be from the output of a rear reduction unit for the wrapping mechanism so that the shaft 71 will make one revolution for each cycle of the wrapping machine. In an alternative arrangement the power may be taken directly from the drive motor and a gear reduction unit may be provided for the transfer and labeling machine and a separate and identical gear reduction unit may be provided for the wrapping mechanism of the wrapping machine, so that again the operation of the transfer and labeling machine will be synchronized with the operation of the wrapping machine.

The drive shaft 71 is connected to drive a right angle gear box 76 (FIGS. 8 and 9) which imparts one revolution of motion to a laterally extending shaft 77 for each revolution of the drive shaft 71. With reference to FIG. 9, the shaft 77 is rotatably mounted on the frame of the machine by bearings 78 and, at one end, is secured to a cam 79 for operating a label pickup mechanism 81 shown in FIGS. 1 and 2, which will be described in detail hereinafter. At its other end, the shaft 77 is connected to impart intermittent rotary motion to the shaft 69 by means of a Geneva wheel arrangement, comprising a driver wheel 82 and a six point driven wheel 83. The driver wheel 82 is secured by a set screw 86 to the shaft 77, and a roller 87 is secured to a side of the wheel 82. The driven wheel 83 is secured to the shaft 69 by another set screw 88 and includes six radially extending slots 89 which are positioned to receive the roller 87 upon rotation of the wheel 82. When the wheel 82 is rotatably driven by the shaft 77, the roller 87 enters one of slots 89 and causes the wheel 83 to rotate one-sixth of a revolution for each full revolution of the wheel 84. Movement of the wheel 83 is relatively slow when the driver 87 first enters a slot 89, then speeds up as the roller approaches the bottom of the slot 89 and then gradually slows down as the roller 87 moves out of the slot 89. Such motion of the wheel 83 is similar to a half sine wave in configuration. When the roller 87 is not turning the wheel 83, the wheel 83 and the shaft 69 are locked against rotation by a concentric surface 90 of the wheel 82 which extends into a concave surface 90a formed in the outer periphery of the wheel 83.

With reference to FIG. 9, the shaft 69 is mounted in bearings 91 for rotation relative to the frame of the machine, and extends parallel to the shaft 77. Since the drive sprocket 68 is secured to the shaft 69, it too moves intermittently as the shaft 77 and the driver wheel 82 are rotated. With reference to FIG. 8 the drive sprocket 68 is connected to the sprocket 66 by a chain 67 as previously explained, and the chain 67 also engages two idler sprockets 92 and 93. The sprocket 92 is mounted for rotation on one end of an arm 94 and the other end of the arm 94 is pivotally connected to the shaft 69. The sprocket 92 is positioned on the outside of the chain 67 and is urged into the chain by means of a cam 96 secured to the shaft 77. A cam follower 97 is rotatably fastened to the arm 94 and rides on the outer surface of the cam 96 as the shaft 77 and the cam 96 are rotated. The cam 96 includes the single rise or lobe 98, the purpose of which will be described shortly.

The inner sprocket 93 is also positioned to engage the outside of the chain 67, and it is rotatably connected to one end of another arm 101, the other end of the arm 101 being pivotally mounted on the shaft 58. The sprocket 93 is constantly urged into the chain 67 by a tension spring 102, which is connected between a pin 102a (FIG. 8) on the arm 101 and the frame of the machine. The portion of the chain 67 between the sprockets 66 and 68, which is engaged by the sprocket 93 may be termed the idling side and is designated by the numeral 103, while the other portion which is engaged by the sprocket 92 may be termed the pulling side and is designated by the numeral 104.

In the operation of the drive unit, the shafts 71 and 77 rotate at a constant rate and the Geneva driven wheel 83 rotates intermittently. The cam 96 is designed such that the sprocket 92 exerts steady and constant tension on the chain 67 while the sprockets 66 and 68 and the chain 67 are stationary. After the roller 87 has entered one of the slots 89, causing movement of the sprockets 66 and 68, the chain 67, and the transfer arms 48, the cam follower 97 begins to ride upwardy on the raised cam surface 98, causing the sprocket 92 to increase the tension on the pulling side 104 of the chain 67. The idling side 103 of the chain 67 straightens out and the tension spring is stretched. As the roller 87 moves out of the slot 89, at which time the transfer of the articles from one station to the next has been completed, the cam 96 has rotated to the point where the follower 97 drops off of the raised cam surface 98, and the sprocket 92 is permitted to swing clockwise as seen in FIG. 8. The pulling side 104 of the chain 67 then relaxes momentarily, and the tension spring 102 pulls the sprocket 93 into the idling half 103 of the chain 67. The driven wheel 83 of the Geneva arrangement is locked, thereby preventing the sprocket 68 from moving, but the sprocket 66 and shaft 58 are able to rotate counterclockwise a short distance as the slack in the chain is taken up. This short counterclockwise movement is imparted to the sprockets 53 driving the chains 49 and 51 causing the transfer arms 48 to move rearwardly a short distance away from the packages. In the present instance, the transfer arms move the packages forwardly approximately one foot, which is the distance between stations, and then the arms are withdrawn rearwardly three-fourths to one and one-half inches. The arms remain in the withdrawn position until the shaft 77 rotates sufficiently far to move the roller 87 into the next slot 89.

The positions of the transfer arms 48 are made adjustable longitudinally of the machine relative to the drive so that the arms will deposit packages at exactly the previously described stations and not in between stations. Such adjustment is accomplished by means of a taper lock bushing assembly 110 which may be loosened to adjust the position of the sprocket 68 relative to the shaft 69. After the adjustment is made, the assembly 110 is tightened to hold the sprocket 68 and chains, and hence the transfer arms 48, in proper relative position.

The described backing off of the arms from the packages is desirable because the scale 22 is designed to automatically weigh a package on the platform when the package has been left undisturbed for a fraction of a second. After the first package of a series has been placed on the scale platform, the platform moves downwardly to a balance position and a weight reading is then made. Weighing of succeeding packages may proceed at a more rapid rate because the scale platform is already in a lowered position due to the preceding packages, and the weight, and consequently the position of the scale platform, does not usually change greatly during the run of a series of packages.

As the packages are moved longitudinally along the transport path by the transfer arms 48, they are guided to lateral positions by guides 111, 112 and 113 (FIG. 3) which are respectively at the weighing, delay and labeling stations. The label pickup mechanism 81 is designed to take a label from the scale 22 and place it on a package. It is desirable that the labels be at substantially the same position on all packages, and studies have shown that an upper corner of the package is most desirable when the package contains meat or other fresh foods. The guides 111 to 113 are designed to laterally position packages such that, regardless of the lateral width of the package, the label will always be placed at its corner which is rearward and closest to the scale.

In FIG. 3, the numeral 116 indicates a relatively large package and the numeral 117 indicates a relatively small package. At the input station 41, the packages are generally symmetrical with the longitudinal center line, indicated by the numeral 118, of the infeed conveyor 47 and a wrapping machine if there is one. The guides 111 to 112 slant forwardly and laterally inward, and are successively closer to the center line 118. Thus, the large package 116 may engage the guide 111 and gradually be moved laterally away from the scale 22, while the small package 117 may engage only the guide 112. Regardless of the size of the package, by the time it reaches the labeling station 44, a portion of the package will be at the location where the label pickup mechanism 81 is designed to deposit the labels.

The transfer arms 48 are preferably constructed to be easily removable when desired, as when the scale 22 is to be operated manually. If desired only certain of the arms may be constructed for removal. Each transfer arm 48 (FIGS. 5, 6 and 7) includes an inverted U-shaped bracket 121 comprising arms 122 having holes formed therein. The distance between the arms 122 is substantially equal to the distance between the chains 49 and 51, and the holes in the arms are connected to extended pins 124 on the chains 49 and 51 (FIG. 6). The bracket 121 is normally permanently connected to the chains. A channel shaped arm 126 is also provided, the arm 126 fitting over the center portion of the bracket 121. It should be noted that the chains 49 and 51 and the brackets are located at the side of the transport path which is away from the scale 22 and the arms 126 extend laterally off to one side of the bracket toward the scale and over the transport path. Each arm 126 is attached to its associated bracket 121 by forming two hooks 127 on the arms 126 and two slots 128 in the bracket 121, the hooks 127 opening in the same direction and located to be inserted into the slots 128. When attaching the arm 126 to the bracket 121, the hooks 127 are inserted into the slots 128 and the arm 126 is shifted laterally to the left as seen in FIG. 6 to move the hooks under the center portion of the bracket 121. Holes 129 and 131 respectively formed in the bracket 121 and the arm 126 are aligned when the bracket 121 and the arm 126 are assembled, and a pin 132 secured to one end of a spring 133, snaps upwardly through the holes 129 and 131 and holds the bracket and the arm in assembled relation. The spring 133 lies flat against the underside of the center portion of the bracket 126 and the other end of the spring 133 is secured to the bracket 126 by a rivet 134 positioned through holes formed through them, the rivet hole formed in the bracket 126 preferably being countersunk. To disengage the arm 126 from the bracket 121, a handle 135 (FIGS. 6 and 7) formed on the spring 133 and extending outwardly from one side of the arm, is manually pressed downwardly to withdraw the pin 130 from the holes 129 adn 131 and permit the arm 126 to be shifted to the right as seen in FIG. 6.

The portion of each arm extending over the transport path has a plurality of vertically extending fingers 141 formed on the forward arm thereof, the fingers being positioned to extend downwardly into longitudinally extending slots 142 (FIG. 2) formed in the plates over which the packages are transferred. The fingers in the grooves prevent very low packages from becoming caught underneath a transfer arm. A bend 143 on a vertical line may be formed on each of the fingers 141. The bends 143 are such that the edge portions of the fingers 141 toward the scale 122 slant rearwardly and toward the scale, which is advantageous because a package sliding laterally of the machine away from the scale, due to the guides 111 and 112, while being pushed by the fingers 141 cannot catch on a sharp edge of one of the fingers. The fingers 141 preferably extend downwardly sufficiently far that they will still be within the slots 142 of the plate at the weighing platform even though this plate is in a relatively low position due to a heavy package being weighed. The rearward vertical portion 144 of the arm 126 extends downwardly to approximately the level of the upper end of the fingers 141.

When the machine 21 is positioned to receive packages from a wrapping machine, the infeed conveyor 47 (FIGS. 1, 4 and 5) is preferably provided to convey packages from one machine to the other. The conveyor 47 comprises a frame 151 having two pairs of sprockets 152 rotatably mounted thereon. The sprockets 152 at the lower end of the frame 151 are mounted on a shaft 153 and the sprockets at the upper end of the frame are secured to a shaft 154 which in turn is rotatably mounted on the frame. A plurality of spaced apart rods 156 extend between and are connected to two chains 157 which are mounted on the sprockets 152. Further, a drive sprocket 158 (FIG. 5) is secured to the shaft 154, and may be connected by a chain 155 (FIG. 1) to be driven by a suitable drive unit, such as the drive unit of the wrapping machine. The motion of the chains 157 and the rods 156 at the top of the conveyor is from the wrapping machine to the transfer and labeling machine 21, and the spacing of the rods 156 and their speed is such that each package is deposited by the wrapping machine between a pair of the rods 156, and the rods move the packages downwardly across a plate 160 and deposit one package in front of each transfer arm 48. The plate 160 is mounted on the frame 151 just below the forwardly moving rods 156, and extends substantially the length of the frame and between the sides thereof.

As previously mentioned, the cam 79 secured to the shaft 77 operates the label pickup mechanism 81. Since the shaft 77 is connected to drive both the transfer arms 48 and the label pickup mechanism, it will be apparent that their movements will be synchronized.

The mechanism 81 comprises a label pickup head 161 (FIGS. 12 to 15 and 19 to 21) connected by a universal joint 160 to the lower end of a rod 162 which in turn is connected to a yoke-shaped head bracket 163. The bracket 163 is secured to a generally horizontal shaft 164 which is rotatably mounted on another bracket 166 (FIG. 15). A stationary vertical shaft 167 (FIG. 12) is mounted on the frame 31 of the machine 21 adjacent the forward and front corner of the scale 22 (FIGS. 12 and 13).

The length of the bracket 166 and the location of the shaft 167 are such that the head 161 may be extended to either the label chute 26 to pick up a label or to a location over the labeling station 44 to place the label on a package. FIG. 14 shows the former position in dashed lines and the latter position in full lines. To swing the head 161 and the bracket 166 between these two positions, the bracket 166 is mounted for pivotal movement on the shaft 167. The bracket 166 is mounted on the shaft 167 by means of a bearing member 168 (FIG. 15) which extends around the shaft 167 and is movable axially of the shaft 167, but does not pivot on the shaft 167 with the bracket 166. The member 168 provides vertical support for the bracket 166, and is turn supported on the upper end of an operating arm 169, the connection between the arm 169 and the member 168 being pivotal on a horizontal axis. The operating arm 169 is connected to the upper end of a vertical shaft 171 by a ball and socket joint 172 (FIGS. 12 and 13) and to the upper end of a link 173 by a pivotal joint 174, the pivotal axis of the joint 174 being horizontal and parallel to the axis of the connection between the arms 169 and the bearing member 168.

The cam 79, previously referred to, is connected to pivot the bracket 166 by means of apparatus including a cam follower 176 (FIGS. 9, 12 and 13) which rides on the outer surfaces of the 79, a cam arm 177 which carries the follower 176 and is pivotally mounted on a pin 178, a tension spring 179 connected between the frame of the machine and one end of the cam arm 177 for urging the arm 177 counter clockwise as seen in FIG. 12, a link 181 connected between the other end of the cam arm 177 and an arm 182 which is secured to the lower end of the shaft 171 (FIG. 9) another arm 183 which is secured to the upper end of the shaft 171 (FIGS. 12 and 13) and an actuating link 184 connected between the arm 183 and the bracket 166. The connections at both ends of both links 181 and 184 are preferably made by ball and socket joints 186, and the distances from the axis of the shaft 171 to the joints 186 on the arms 182 and 183 are substantially equal and are also substantially equal to the distance from the axis of the shaft 167 to the joint 186 on the bracket 166 (FIG. 12).

The cam 79 has a substantially constant radius over an approximately 240° portion, indicated by the numeral 191 (FIG. 12) of its outer surface, and a reduced radius portion, indicated by the numeral 192, over the remaining 120° of its outer surface. When the cam follower 176 engages the surface portion 192, the spring 179 swings the cam arm 177 (FIG. 12) counterclockwise and the arms 182 and 183 are pivoted clockwise as seen in FIG. 14, through an angle of approximately 90°. The bracket 166 carrying the label pickup head 161 is also turned to a position where the head 161 is adjacent the label chute of the scale 22.

When the cam follower 176 is on the surface portion 191 of the cam 79, the follower 176 and the cam arm 177 are pivoted clockwise as seen in FIG. 12, and the arms 182 and 183 are turned to the positions shown in full lines in FIGS. 9 and 14, and the bracket 166 is correspondingly turned and stop at a position where the head 161 is directly over the location where the label will be placed on a package.

The plane in which the above described swinging movement of the head 161 takes place is spaced above the top surface of a package to be labeled, and means is also provided to lower the head 161 downwardly to the package. This last named means comprises the previously mentioned link 173 which is pivotally connected to the operating arm 169 by the joint 174. The link 173 extends downwardly from the arm 169 and at its lower end is pivotally connected to one end of another cam arm 196 (FIG. 12). The cam arm 196 at its other end is pivotally connected to the frame of the machine and intermediate its ends carries another cam follower 197 which also rides on the cam surface of the cam 79. The two cam followers 176 and 197 are separated by an angle of approximately 140°. When the follower 197 engages the cam surface portion 191, the link 173 and the bearing member 168 are shifted upwardly (FIG. 12) and the bracket 166 is held in the described upper position where the head 161 is spaced from the package but in substantially horizontally aligned with the label chute of the scale. Since the lower end of the arm 169 is connected to the shaft 171 and cannot move vertically whereas its upper end is connected to the member 168 which supports the bracket 166 and which can slide vertically on the shaft 167, it will be apparent that vertical movement of the link 173 is transferred to the bracket 166 and the head 161. When the cam follower 197 rides onto the cam surface portion 192, the link 173 is able to drop downwardly, and the weight of the bracket 166 and the members attached to it causes the bracket 166 to slide downwardly on the shaft 167 until the head 161 engages the package to be labeled. Since the head 161 moves downwardly due to gravity until it engages a package, no adjustment need be made for package height.

The shaft 167 is secured to a mounting bracket 198 (FIG. 12) and is stationary, and the sliding movement of the bracket 166 is on a vertical axis. Therefore, the bearing member 168 on the upper end of the arm 169 also moves vertically which requires the lower end of the arm 169 to shift laterally during vertical movement of the bracket 166. To accommodate this shift, the lower end of the shaft 171 is connected to a mounting bracket 199 by a spherical bearing 201, and the upper end portion of the shaft 171 is positioned between guides 202 which permit the shaft 171 to pivot somewhat on its lower end.

The label pickup head 161, to be described in more detail hereinafter, is provided with suction means for picking up a label, and a heater for activating the glue on the label. When the head 161 is moved closed to a label in the label chute, the label is sucked up and held against the lower face of the head 161. The label is picked up glue side down, and the heater in the head 161 activates the glue before the label is placed on the package.

The label is applied to a package with the head 161 in a substantially horizontal position, but the label in the label chute before it is picked up by the head 161 may be inclined at an angle of approximately 35°. To tilt the head 161 from the horizontal when picking up a label, a pin 221 (FIGS. 12, 14 and 15) is secured to the shaft 164 which is rotatable about its axis relative to the bracket 166. The pin 221 (FIGS. 14 and 15) angles upwardly and extends through a radial slot 222 formed in a disc 223 secured to the bearing member 166 above the upper end of the shaft 167. When the bracket 166 pivots on the shaft 167, the disc remains stationary and the pin 221 engaging the disc 223 tilts and rotates the shaft 164 through an angle of approximately 35°. The head 161 being connected to the shaft 164 correspondingly tilts to the correct angle for picking up a label.

In addition to the described movements, it is necessary for the head 161 to be rotated about the axis of the shaft 162 because the label when in the label chute is displaced approximately 90° from the desired position when on a package. Rotation of the head 161 is accomplished by securing a toothed pulley 226 (FIG. 20) to the shaft 162 carrying the head 161 and securing another toothed pulley 227 (FIG. 15) to the bearing member 168 which carries the bracket 166. The shaft 162 and the pulley 226 are rotatable on the head bracket 163 and the other pulley 227 is non-pivotal on the shaft 167 but the bracket 166 pivots relative to the shaft. A toothed timing belt 228 (FIG. 14) connects the two pulleys 226 and 227, and the ratio of the two pulleys is two to one.

When the bracket 166 swings 90° from one position to the other, the pulley 227 remains stationary relative to the shaft 167 while the other pulley 226 swings through an arc of 90°. The two to one ratio of the pulleys causes the pulley 226 and the head 161 to rotate 180° relative to the bracket, but since the bracket 166 has pivoted 90°, the displacement of the head 161 between the two positions is only 90°. Thus, the head 161 is able to pick up a label in the label chute and turn it 90° before placing it on the package.

To summarize the operation of the label pickup device, assume that a label has just been placed on a package. Rotation of the shaft 77 turns the cam 79 and the cam follower 197 passes from engagement with the portion 192 to the portion 191 of the cam surface, and the bracket 166 carrying the pickup head 161 moves upwardly away from the package. Continued rotation of the shaft 77 moves the transfer arms 48 forwardly and the labeled package is pushed toward the discharge station and the package at the delay station is pushed toward the labeling station.

Almost immediately after the labeling head 161 is moved upwardly, the cam 79 moves to where the follower 176 engages the portion 192 and the head 161 swings 90° to the label chute. Simultaneously, the head 161 also tilts due to the pin 221 and rotates 180° relative to the bracket 166 due to the belt 228. When the head 161 moves to approximately one eighth of an inch of the label, the label is sucked up. Continued rotation of the cam 79 causes the head 161 carrying the label to swing back toward the labeling station, and when the follower 176 passes from the portion 192 to the portion 191 of the cam 79, the head is suspended over the labeling station. The head 161 holds a label for approximately one quarter of a revolution of the cam 79, which gives the heater in the head 161 sufficient time to heat the label and activate the glue. As soon as the transfer of the next package to the labeling station is complete, the follower 197 engages the portion 192 of the cam 79 and the head 161 drops downwardly and slaps the label on the top surface of the package. The adhesion of the glue on the package is sufficient to overcome the force of the vacuum of the pickup head 161, and therefore the label remains on the package when the head moves upwardly at the beginning of the next cycle.

With reference to FIGS. 9 and 11, a switch 231, connected in the computer circuit of the scale 22, is actuated when a label is picked up from the label chute 26, and enables the computer to compute information concerning the next package and print another label. The switch 231 is actuated by a cam 232 secured to the end of the shaft 77 closest to the scale 22 and a single lobe 233 on the cam 232 actuates the switch 231 at the time or just before the head 161 has picked up a label.

The construction of the label pickup head 161 is shown in more detail in FIGS. 17 and 19 to 21, and comprises a generally rectangular member 236 having a circular boss 237 formed on its upper surface. A pin 238 (FIG. 20) extends into the boss 237 and is secured to the member 236 by a set screw, the upper end of the pin 238 being connected by the joint 160 to the rod 162. A coiled compression spring 239 is positioned around the boss 237 and the pin 238, its bottom surface engaging the top side of the member 236 and its top surface engaging a cap 241 which is anchored to the rod 162 by a ring 242. The spring 239 tends to hold the member 236 generally perpendicular to the rod 162 but does permit some pivotal movement at the joint 160.

Between the top and bottom sides of the member 236 are formed two holes 243 and 244, the two holes extending in side-by-side relation from one end of the member 236. The hole 243 extends through to the other end of the member 236 while the other hole 244 terminates short of the other end of the member 236. The hole 243 receives a rod-like heating element 246, and, to secure the element 246 to the member 236, a slot 247 is formed in the member 236 from the hole 243 to the adjacent edge and screws 248 are provided at the slotted portion of the member to cause the slotted portion to pinch and hold the element 246 when tightened.

Air passages are also formed in the member 236, comprising the hole 244 and another hole 251 which is perpendicular to the holes 243 and 244. The hole 251 extends from the front edge of the member to a vertical hole 252 formed in a protruding portion 253 of the member 236, the hole 251 intersecting the holes 243 and 244. From the hole 251, three vertical holes 254 extend downwardly to the bottom surface of the member 236, and shallow grooves 256 are formed in the bottom surface. An X-shaped groove 256 is provided for each hole 254, each hole 254 being at the center of its associated groove.

The protruding portion 253 of the member 236 is shaped to be connected to the end of a flexible air hose 257, the other end of which may be connected to a vacuum pump (not shown). The hose 257 is preferably made of a material such as silicone rubber which is able to withstand considerable heat because the member 236 gets hot during operation.

Electrical connection to the heating element 246 is provided by wires 258 which run through the hose and out of the end thereof connected to the member 236. A plug connector 259 is provided so that a defective heating element may be easily replaced by loosening the screws 248, disconnecting the element 246, pulling it out of the hole 243, and replacing it with a good one.

When the heating element 246 is secured in place, it closes the end of the hole 251 of the front of the member 236, and the pin 238 closes the hole in the boss 237. After the hole 244 is formed, its open end portion is tapped and a plug 261 is provided to close the end of this hole. Therefore, when a vacuum is connected to the hose 257, air can be drawn into the member 236 only through the holes 254. This flow of air sucks up a label without the necessity of the pickup head engaging the label chute 26 and jarring the scale 22. After the label is picked up, it partially closes off the holes 254 and the vacuum extends into the grooves 256 and causes the label to lie flat against the bottom surface of the member 236. The heating element 246 heats the member 236 and the heat activates the glue on the label. Thus, the design of the grooves 256 is such that the label is held flat against the member 236 but there is still a substantial area of contact between the label and the member 236 so that the label will be well heated. Air flowing through the head into the hose 257 prevents overheating of the hose.

The label chute 26 is shown in FIGS. 16 to 18, and is designed to permit either manual or automatic operation of the scale. A scale as supplied by the manufacturer normally includes inclined plates 271, 272 and another center plate (not shown) between the plates 271 and 272. When using the scale with a transfer and labeling machine in accordance with the invention, the center plate is removed and an attachment 273 is provided in its place.

The attachment 273 comprises a platelike member 276 bent at an acute angle to form a vertical portion 277, which is attached by a screw 278 and an angle 279 to the frame 281 of the scale. Slots 282 are formed through the plate 276, which may receive upwardly extending fingers 283 formed at the lower edge of another member 284. The members 276 and 284 are pivotally connected by a pin 286, and a spring 287 urges the member 284 to the position where the fingers extend upwardly through the slots 282. The spring 287 is secured to one of the screws 278 and its lower or free end portion extends under the bottom surface of the member 284 and urges it upwardly. The lower end portion of the spring may be tapered as shown in FIG. 18 to provide proper spring pressure.

Off to one side of the members 276 and 284, a downwardly extending arm 288 is formed on the member 284. The arm 288 is engaged by a bolt 289 (FIG. 17) whenever the mechanism picks a label up from the chute, the bolt 289 being secured to a bracket 291 which in turn is secured to the bracket 166 of the label pickup mechanism. Such engagement of the arm 288 by the bolt 289 retracts the fingers 283 as shown in FIG. 17. The fingers 283 may be held in retracted position by a rectangular cam 293 pivotally mounted on the member 284 by a pin 294. The cam 293 is secured to the pin 294 which is bent to form a handle 296. In one position of the cam, the fingers 283 are held retracted from the slots 282 while in another position of the cam 293, the spring 287 is permitted to push the fingers upwardly into the slots above the upper surface of the member 276.

To operate the scale manually as when very large packages are to be handled, the cam 293 is turned to retract the fingers 283 and an adjustment is made in the scale to cause the labels to be placed in the chute with the glue side up. Labels then slide downwardly across the member 276 to the plate 272 and are heated by the scale heater 27 and then manually applied to the packages.

For automatic operation, the scale is adjusted to place the labels glue side down in the chute, and the cam 293 is turned to extend the fingers 283 through the slots in the member 276. The fingers 283 catch a label as it comes down the chute, and restrains it until the pickup head 161 swings around and sucks it up. The bolt 289 engages the arm 288 and retracts the fingers 283 as the label is being picked up, so that the fingers cannot flick the label off the pickup head. As the pickup head swings away from the chute with the label, the spring 287 causes the fingers 283 to again extend through the slots to catch the next label coming down the chute.

In summary, the transfer and labeling machine is designed to permit manual operation of the scale 22 when desired, or automatic operation of the scale at the substantially maximum rate of operation of the scale or at a slower rate if desired. The spacing of the stations along the transport path is such that, at the maximum rate of operation of the scale, the scale will have sufficient time to compute information and print a label before the package arrives at the labeling stations. The delay station between the weighing and labeling stations ensures that the scale will have sufficient time for this operation, and it also decreases the distance between stations. The decreased distance is advantageous because it results in less abrupt movements. The transfer arms 48 are also designed to be removed during manual operation.

During automatic operation, the movement of the transfer arms is primarily in the forward direction, there being only a slight rearward movement to permit undisturbed weighing of a package.

The mechanism for picking up a label is advantageous because it is timed with the operation of the transfer arms and it heats up a label while transferring it from the scale to the package. Further, only slight modification may be required in the label pickup mechanism to accommodate scales of different manufacturers.

I claim:

1. A transfer and labeling machine for use with a scale including means for weighing a package positioned at a weighing station, and means for printing data relative to the package on a label and placing the printed label in a label chute, said machine comprising means forming a package transport path, at least one transfer arm, means for mounting said transfer arm such that it extends across said path means and for moving said transfer arm throughout the length of said path means, said path means leading to and beyond said weighing station to a labeling station adjacent the label chute of the scale and then to a discharge station, said transfer arm by its movement throughout the length of said path means being adapted to move a package along the path to said weighing station and then to said labeling station and then to said discharge station, and means for picking up a label in the label chute and placing it on the package when the package is at said labeling station.

2. A machine as in claim 1, wherein said scale also includes means for computing the price of the package, and said data includes the price, and wherein said path means further includes a delay station between said weighing station and said labeling station, said means for mounting and moving said transfer arm being operable to move the package from said weighing station through said delay station and to said labeling station and the length of time required for said transfer arm to move the package from said weighing station through said delay station and to said labeling station is substantially equal to the length of time required for the scale to compute the price of the package after weighing it, print a label, and place the printed label in the label chute.

3. A machine as in claim 1, wherein said means for mounting and moving said transfer arm along said path is constructed to move said transfer arm forwardly along the path to push the package to said weighing station, then to withdraw said transfer arm from the package and to maintain the transfer arm withdrawn from the package long enough for the scale to weigh the package, then to move said transfer arm forwardly to push the package to said labeling station, and then to move said transfer arm forwardly to push the package to said discharge station.

4. Apparatus as in claim 2, wherein said stations are longitudinally spaced and are equal distances apart, and a plurality of transfer arms are provided, said arms being spaced a distance apart substantially equal to the distance between adjacent stations.

5. Apparatus as in claim 4, wherein said mounting and moving means for said transfer arms is constructed simultaneously to move said transfer arms forwardly along said transport path, to stop the forward movement of said transfer arms at locations adjacent said stations, and then to move said transfer arms rearwardly a relatively short distance.

6. Apparatus as in claim 1, wherein a plurality of transfer arms are provided for moving a continuous series of packages along said package transport path, each of said arms moving the full length of said transport path and thereby moving one of said packages through each of said stations.

7. Apparatus as in claim 1, wherein said transfer arm is removably connected to said mounting and moving means.

8. Apparatus as in claim 1, wherein said mounting and moving means comprises a pair of laterally spaced chains connected to be driven by a plurality of sprockets, a bracket extending laterally between and secured to said chains, said chains and said bracket being located adjacent one longitudinal side of said transport path, and said transfer arm being removably connected to said bracket and extending from said bracket laterally of said machine and across said transport path.

9. Apparatus as in claim 8, wherein said bracket is in the shape of an inverted U and a plurality of slots are formed in its center portion, said transfer arm fitting over said center portion of said bracket and having downwardly extending hooks formed thereon inserted into said slots for connecting said arm to said bracket upon a lateral shift in one direction of said arm relative to said bracket, said arm and said bracket having holes formed in them which are aligned when said arm and said bracket are assembled, a spring secured to said bracket, and a pin secured to said spring and positioned to extend into said holes, said spring urging said pin into said holes.

10. Apparatus as in claim 9, wherein a handle is formed on said spring for manually moving said spring to a position where said pin is retracted from said holes to permit said arm to be removed from said bracket.

11. Apparatus as in claim 1, wherein said means forming said transport path has a plurality of longitudinally extending slots formed therein over at least a portion of its length, and said transfer arm has a plurality of fingers formed thereon positioned to extend downwardly into said slots to prevent a package from becoming jammed underneath said transfer arm, and further comprising lateral guide means positioned adjacent a longitudinal edge of said transport path for effecting a lateral shift of at least some packages as they are being moved by said transfer arm forwardly along said transport path, and the edges of each finger which on the side of said finger toward said guide means are bent rearwardly to prevent a laterally moving package from catching on one of said fingers.

12. Apparatus for transferring a label from a label chute to the upper side of a stationary package, the label having data relative to the package printed on the upper side thereof, and the package being located at a labeling station, said apparatus comprising a label pickup head, and means supporting said label pickup head for swinging movement between a label pickup position above the label chute and a label applying position above the package, said pickup head engaging the upper surface of the label having the printing thereon, said means further supporting said label pickup head for vertical movement when said head is in said label applying position downwardly to a level where said head and the label carried thereby engage the upper side of the package.

13. Apparatus for transferring a label from a label chute to the upper side of a stationary package, the label having data relative to the package printed on the upper side thereof, and the package being located at a labeling station, said apparatus comprising a label pickup head, and means supporting said label pickup head for swinging movement between a label pickup position above the label chute and a label applying position above the package, said pickup head engaging the upper surface of the label having the printing thereon, said swinging movement being about a vertical axis through an angle of substantially 90° back and forth between said label pickup position and said label applying position.

14. Apparatus for transferring a label from a label chute to the upper side of a stationary package, the label having data relative to the package printed on the upper side thereof, and the package being located at a labeling station, said apparatus comprising a label pickup head, and means supporting said label pickup head for swinging movement between a label pickup position above the label chute and a label applying position above the package, said pickup head engaging the upper surface of the label having the printing thereon, the label chute being such that a label is placed in the chute in an inclined position, and said head being also mounted for tilting movement such that it may tilt to pick up a label and then move the label to a generally horizonal position before applying the label to a package.

15. Apparatus as in claim 13, wherein said head is also mounted for rotative movement about an axis other than said vertical axis while swinging between said pickup position and said applying position.

16. Apparatus as in claim 13, wherein said means supporting said pickup head comprises a substantially vertical shaft, a bearing member mounted for vertical movement on said shaft, a bracket mounted on said bearing member for swinging movement relative thereto, said label pickup head being connected to said bracket at a location spaced from said shaft, said swinging movement of said bracket moving said head between said label pickup position adjacent the chute and said label applying position above the package, a rotatably driven cam, first linkage extending from said cam to said bearing member for moving said bearing member vertically on said shaft when said head is at said label applying position, and second linkage extending from said cam to said bracket for effecting said swinging movement of said bracket and said head.

17. Apparatus as in claim 16, wherein said head is mounted by another shaft for tilting movement on said bracket, and a pin is secured to said other shaft and slidably engages said bearing member such that said other shaft and said head is tilted during said swinging movement of said bracket and said head relative to said bearing member.

18. Apparatus as in claim 17, wherein said head is mounted on said shaft by a pin for rotative movement on a substantially vertical axis, a first pulley is secured to said pin, a second pulley is secured to said bearing member, and a belt connects said pulleys, whereby said head and said pin are rotated relative to said bracket and said other shaft during said swinging movement.

19. Apparatus as in claim 18, wherein said head swings through an angle of substantially 90° and is rotated through an angle of substantially 180° by said belt, whereby the resultant displacement of said head is 90° between said label pickup position and said label applying position.

20. Apparatus as in claim 1, wherein said means for picking up a label and placing it on a package comprises a pickup head including vacuum means for sucking up and holding a label and an electrical heater for activating glue on the label.

21. Apparatus as in claim 20, wherein said head has a hose adapted to be connected to a vacuum source, and wires leading to said heater extend through said hose.

22. Apparatus as in claim 21, wherein said head includes a substantially flat surface for engaging a label, air passages formed through said head from said hose to holes in said surface, and X shaped grooves formed in said surface each of said holes intersecting one of said grooves.

23. Apparatus for transferring a label from a label chute to the upper side of a stationary package, the label having data relative to the package printed on the upper side thereof, and the package being located at a labeling station, said apparatus comprising a label pickup head, and means supporting said label pickup head for swinging movement between a label pickup position above the label chute and a label applying position above the package, said pickup head engaging the upper surface of the label having the printing thereon, and further including an attachment for the label chute, said attachment comprising a plate over which labels may slide, a plurality of fingers mounted below said plate for movement through slots formed in said plate, a spring for urging said fingers upwardly through said slots to positions where they may catch a label sliding downwardly across said plate, and adjustable cam means for holding said fingers retracted from said slots.

24. Apparatus as in claim 23, wherein said attachment further includes an arm connected to said fingers, said means for picking up a label engaging said arm and retracting said fingers as a label is being picked up.

25. Apparatus for use with a scale including means for weighing a package positioned at a weighing station and means for printing data relative to the package on a label and placing the printing label in a label chute at a labeling station, said apparatus comprising means forming a package transport path, at least one transfer arm, and means for mounting said transfer arm such that it extends across said path means and for moving said transfer arm along said path means, said path means leading to and beyond said weighing station to said labeling station and then to a discharge station, said transfer arm being adapted to move a package along the path to said weighing station and then to said labeling station, and then to said discharge station, said means for mounting and moving said transport arms comprising a pair of laterally spaced chains mounted on sprockets for movement adjacent said transport path, and means for intermittently moving said chains and said sprockets from a continuously rotating drive shaft including a Geneva wheel assembly connected between the drive shaft and a drive sprocket, and a drive chain connecting said drive sprocket to one of said first mentioned sprockets.

26. Apparatus as in claim 25, wherein said mounting and moving means further includes first and second idler sprockets respectively engaging the pulling and idling sides of said drive chain, said first idler sprocket being cam urged into said drive chain and said second idler sprocket being spring urged into said drive chain, said cam being shaped to release tension on said pulling side of the chain just after said transport arm has been moved forwardly to one of said stations, such release of tension permitting said second idler cam to move said first mentioned chains and said transfer arms rearwardly a short distance.

References Cited
UNITED STATES PATENTS

| | | | |
|---|---|---|---|
| 2,449,669 | 9/1948 | Pohlers | 198—168 |
| 2,651,429 | 9/1953 | Von Hofe | 156—572 |
| 2,708,504 | 5/1955 | Puzey | 198—172 X |
| 3,242,031 | 3/1966 | Kuts | 156—568 |
| 2,983,398 | 5/1961 | Carter | 156—566 |
| 3,157,555 | 11/1964 | Newman | 156—572 |
| 3,194,710 | 7/1965 | Stremke et al. | 156—360 |
| 3,232,815 | 2/1966 | Klopfenstein et al. | 156—360 |
| 3,264,161 | 8/1966 | Stremke et al. | 156—360 |

EARL M. BERGERT, *Primary Examiner.*

M. L. KATZ, *Assistant Examiner.*